United States Patent
Sanz Pascual et al.

(10) Patent No.: US 9,644,386 B2
(45) Date of Patent: May 9, 2017

(54) CONNECTION BETWEEN LATTICE TOWER AND NACELLE

(71) Applicant: NABRAWIND SL, Pamplona (ES)

(72) Inventors: Eneko Sanz Pascual, Pamplona (ES); Hely Ricardo Savil Costa, Uterga (ES)

(73) Assignee: NABRAWIND SL, Pamplona (ES)

( * ) Notice: Subject to any disclaimer, the term of this patent is extended or adjusted under 35 U.S.C. 154(b) by 0 days.

(21) Appl. No.: 15/254,477

(22) Filed: Sep. 1, 2016

(65) Prior Publication Data

US 2016/0369522 A1    Dec. 22, 2016

Related U.S. Application Data

(63) Continuation of application No. PCT/ES2014/000036, filed on Mar. 4, 2014.

(51) Int. Cl.
| | |
|---|---|
| E04B 1/19 | (2006.01) |
| F03D 13/20 | (2016.01) |
| E04H 12/34 | (2006.01) |
| E04H 12/00 | (2006.01) |
| F03D 1/00 | (2006.01) |
| F03D 13/10 | (2016.01) |

(52) U.S. Cl.
CPC ............... *E04H 12/34* (2013.01); *E04B 1/19* (2013.01); *E04B 1/1909* (2013.01); *E04H 12/00* (2013.01); *F03D 1/001* (2013.01); *F03D 13/10* (2016.05); *F03D 13/20* (2016.05); *E04B 2001/1975* (2013.01); *E04H 2012/006* (2013.01); *F05B 2240/9121* (2013.01); *Y02E 10/728* (2013.01)

(58) Field of Classification Search
CPC ... E04H 12/34; E04H 12/00; E04H 2012/006; F03D 1/001; F03D 13/20; E04B 1/1909; E04B 1/19; E04B 2001/1975; Y02E 10/728; F05B 2240/9121
USPC ..................... 52/40, 651.01, 651.07, 651.09
See application file for complete search history.

(56) References Cited

U.S. PATENT DOCUMENTS

| | | | | |
|---|---|---|---|---|
| D84,904 | S * | 8/1931 | Tate ................................ | 40/217 |
| 4,366,386 | A * | 12/1982 | Hanson ...................... | F03D 1/06 290/44 |
| 5,375,353 | A * | 12/1994 | Hulse ........................ | H01Q 1/44 343/721 |
| 5,870,877 | A * | 2/1999 | Turner .................... | B29C 70/52 52/309.1 |
| 6,320,273 | B1 * | 11/2001 | Nemec .................... | F03D 3/005 290/43 |
| 7,735,290 | B2 * | 6/2010 | Arsene .................... | F03D 1/001 248/127 |
| 8,123,484 | B2 * | 2/2012 | Choi ........................ | F03D 80/00 416/145 |

(Continued)

*Primary Examiner* — Brent W Herring
(74) *Attorney, Agent, or Firm* — Edell, Shapiro & Finnan LLC

(57) ABSTRACT

An apparatus for connecting a lattice tower to the nacelle of a wind turbine. The apparatus has high flexural rigidity and enables direct transition between the nacelle and members of the lattice tower. The apparatus includes two rings joined together with vertical plates extending between them. Upper and lower faces of the apparatus are formed by upper and lower horizontal plates. Central ribs are coupled together and with the vertical plates through a plurality of attachment pieces. The central ribs in part form a large central polygonal hole for accommodating an electrical generator.

15 Claims, 10 Drawing Sheets

(56) References Cited

U.S. PATENT DOCUMENTS

| | | | | |
|---|---|---|---|---|
| 8,544,214 B2 * | 10/2013 | Bagepalli | ............... | E02D 27/42 |
| | | | | 248/163.1 |
| 8,608,449 B2 * | 12/2013 | Yan | ............... | F03D 13/20 |
| | | | | 416/244 R |
| 9,347,433 B2 * | 5/2016 | Schellstede | ............. | F03D 9/002 |
| 9,410,340 B2 * | 8/2016 | Zhao | ............... | E02B 17/0004 |
| 9,487,945 B2 * | 11/2016 | Drewes | ............... | E04B 1/40 |
| 2005/0196280 A1 * | 9/2005 | Gonzalez | ............... | F03D 7/0204 |
| | | | | 416/131 |
| 2006/0277843 A1 * | 12/2006 | Livingston | ............. | E04H 12/10 |
| | | | | 52/110 |
| 2009/0249707 A1 | 10/2009 | Curme | | |
| 2011/0076154 A1 * | 3/2011 | Yan | ............... | F03D 13/20 |
| | | | | 416/244 R |
| 2011/0150631 A1 * | 6/2011 | Choi | ............... | F03D 13/20 |
| | | | | 415/119 |
| 2011/0248506 A1 * | 10/2011 | Ruiz Urien | ............. | F03D 1/001 |
| | | | | 290/55 |
| 2012/0023860 A1 | 2/2012 | Voss | | |
| 2014/0015255 A1 * | 1/2014 | Schellstede | ............. | F03D 9/002 |
| | | | | 290/55 |
| 2015/0204101 A1 * | 7/2015 | Zhao | ............... | E02B 17/0004 |
| | | | | 52/704 |
| 2015/0354203 A1 * | 12/2015 | Drewes | ............... | E04B 1/40 |
| | | | | 52/651.01 |
| 2015/0361685 A1 * | 12/2015 | Abreu | ............... | E04C 3/08 |
| | | | | 52/40 |
| 2016/0376807 A1 * | 12/2016 | Johnson | ............... | F03D 1/001 |
| | | | | 269/45 |
| 2017/0009747 A1 * | 1/2017 | Johnson | ............... | F03D 13/20 |

\* cited by examiner

CONNECTION BETWEEN LATTICE TOWER AND NACELLE

CROSS-REFERENCE TO RELATED APPLICATIONS

This application relates to and claims the benefit and priority to International Application No. PCT/ES2014/000036, filed Mar. 4, 2014.

TECHNICAL FIELD

The present invention is comprised in the field of wind turbines, and more specifically it relates to an attachment system for attaching a wind turbine tower to the nacelle in which the power generating elements are located.

BACKGROUND

Today there is a wide range of wind turbines comprising a tower that consists of a lattice structure either partially or in its entirety. There is extensive prior art in relation to connecting lattice towers and the final tower segments that will support the nacelle. The element that is most commonly used as the transition piece is a disc that can have different configurations and even different materials, depending on the use to be made of it.

In that sense, patent document US 2012023860 A1 discloses the transition between a lattice tower and a tower segment supporting the nacelle. The transition is done with a concrete disc such that the metallic ends of the lattice tower are embedded in the solid disc formed by concrete.

Patent document US 20090249707 A1 discloses the transition through a circular ring separating the fixed part corresponding to the lattice tower from the moving part or nacelle. The ring is metallic, not very thick compared to its diameter and it is connected to the yaw ring which in turn supports the nacelle by means of four bearings.

However, this latter solution is not altogether satisfactory because the ring has a large diameter and it is not very thick, and it cannot withstand the stresses required for a large sized nacelle. In addition, the cost of the material and the transport and mounting of a ring of these characteristics is not viable.

The size of wind turbines has increased over time, and accordingly the momentums and stresses to be withstood in the structure housing the nacelle have increased. The transition between the tower and the nacelle must be provided by a structural piece that transmits the aerodynamic and gravitational loads of the wind turbine from the rotor to the tower, therefore passing through the nacelle and through the transition piece between the yaw system thereof and the tower. The resulting vertical loads, which are transverse to the plane of the ring provided in patent document US 20090249707 A1, generate significant bending therein. Since the ring is not very thick, it does not present sufficient flexural rigidity. In order to withstand said bending loads, the lattice of the tower must branch out and the distance between supports of said ring must be reduced. As a result, a very complex three-dimensional structure is obtained in the transition area.

This and other problems are solved in the apparatus disclosed herein, where the transition structure presents enormous flexural rigidity and allows direct transition between the continuous crown of the yaw system of the nacelle and the vertical members of the lattice tower.

There are a number of lattice tower configurations in which the number of main columns and the distance between columns along the height of the tower vary. The most extreme case as regards complexity for the solution of the transition piece is that of a tower having three main columns and a constant distance between columns along the entire height thereof. In this case, the transition piece may have a diameter close to 15 meters and the distance between columns may be about 12 meters.

The transition structure disclosed herein can withstand said loads. Furthermore, a larger number of legs or an additional support between legs can be added to increase support points in the plane of contact between the transition piece and the lattice.

Obtaining this transition piece which, attached to a lattice tower and a nacelle, withstands all the stresses to which it is subjected, which can include a yaw system for the nacelle and which provides stable support with a certain maneuverability for mounting the elements integrated in the nacelle, is a huge design challenge, and the object of the present invention is to provide a low-weight structure that efficiently transmits loads and has a low associated cost. This solution will also be efficient with smaller diameters and a larger number of main columns.

SUMMARY OF THE DISCLOSURE

The interface between a lattice tower and the heavy transition piece of a high-power (multi-megawatt) wind turbine is usually made either by means of welded attachment (which requires specialized workers) or by means of screwed attachment (which will always be simpler as they are metallic pieces).

A connecting system formed by a transition piece arranged between a tower and a nacelle is disclosed. According to one embodiment the piece has a circular contour, large dimensions in terms of diameter and height and has both horizontal faces comprising smooth and clear surfaces to make it easier to mount the drive train and the rest of the elements required for power production and control, having a bearing system on its outer horizontal periphery and its corresponding yaw ring. The center of the connecting system is hollow and according to one embodiment forms a large ring. Said connecting piece performs the transition between a lattice tower screwed down on the lower horizontal face and a mainframe housing the rotor and the drive train and supported on the upper horizontal face, above the yaw ring.

Preferably, the volume enclosed by said piece to be useful as a technical area for both distribution boards and for maintenance needs. It is also desirable that the shell of the nacelle therefore covers the drive train with a minimum volume so as to not interfere with the airflow on the outside.

According to one embodiment the transition piece is formed by at least three sectors which are attached to one another forming the ring, inside which a series of ribs providing the assembly with rigidity are assembled. According to some embodiments both horizontal faces of the transition piece are covered with metal plates and it is completed with the yaw ring.

The advantages provided by this system are:

The use of a lattice tower thanks to its low cost, said cost being further reduced as the result of using a tower with three columns and few cross members arranged between columns. Nevertheless, the invention can also be used for more columns. Another advantage of the tower with a straight section is that it is easy to standardize the cross members and the attachments, the mounting process can be simplified and the resulting loads between nacelle and columns can be reduced due to the larger reaction arm. Finally, modularity makes it easier and less expensive to transport the tower.

This tower and nacelle configuration requires a large diameter connecting system. This large diameter is associated with the advantage of a large reduction of the resulting vertical loads in the main columns of the tower. However, in regard to the transition piece, the distance between supports, and therefore bending loads, have also been increased. As a result, the structure is even more effective than in those cases of towers with more main columns and a smaller distance between columns. Furthermore, the structure with an annular shape allows embedding the generator in the central opening and therefore reducing the distance between the shaft of the rotor and the plane of yaw, which accordingly reduces loads.

BRIEF DESCRIPTION OF THE DRAWINGS

A set of drawings is provided to help to better understand the present disclosure and are expressly related to an embodiment presented as a non-limiting example thereof.

DETAILED DESCRIPTION

Figure 1:
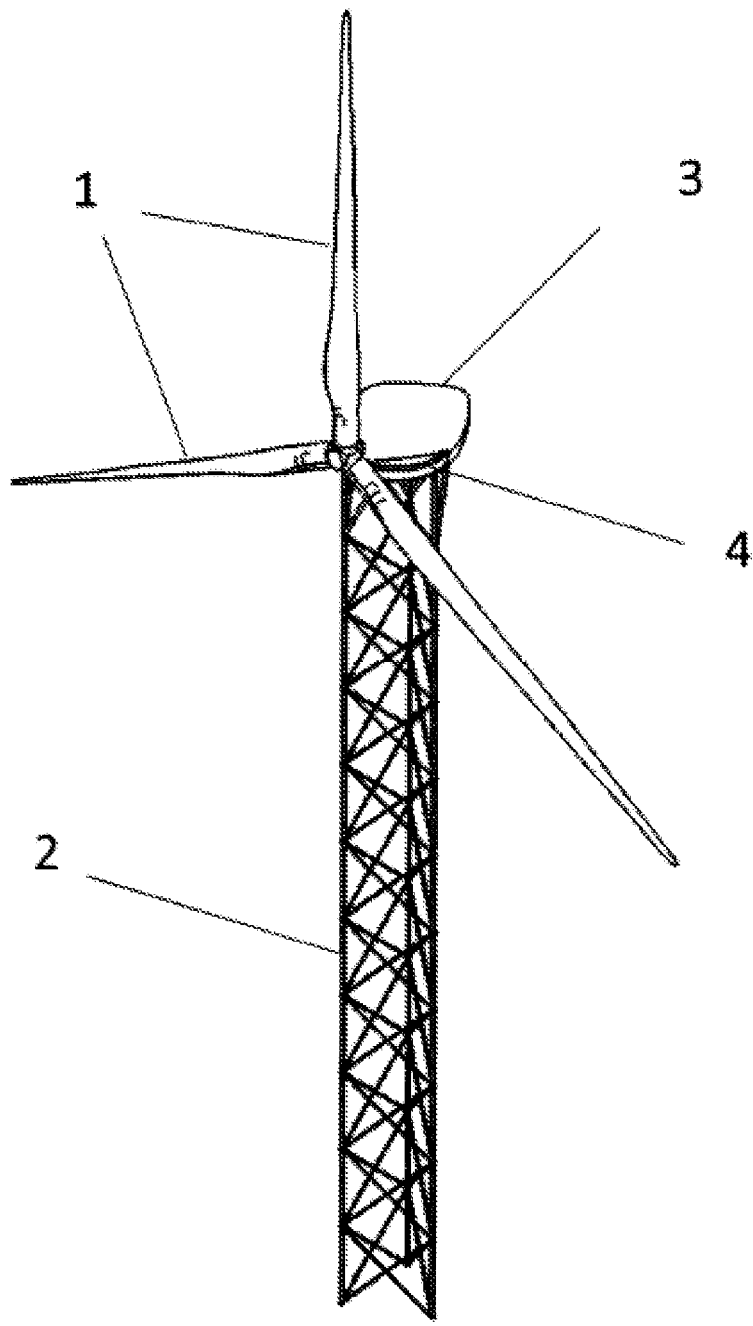
FIG. 1 is a view of a complete wind turbine assembly.

According to one embodiment the wind turbine is a horizontal axis wind turbine, with at least two blades 1 oriented to the wind and with a lattice tower 2 having at least three legs. The connecting piece 4 is arranged between the nacelle 3 and the tower 2, as shown in FIG. 1.

Figure 2:
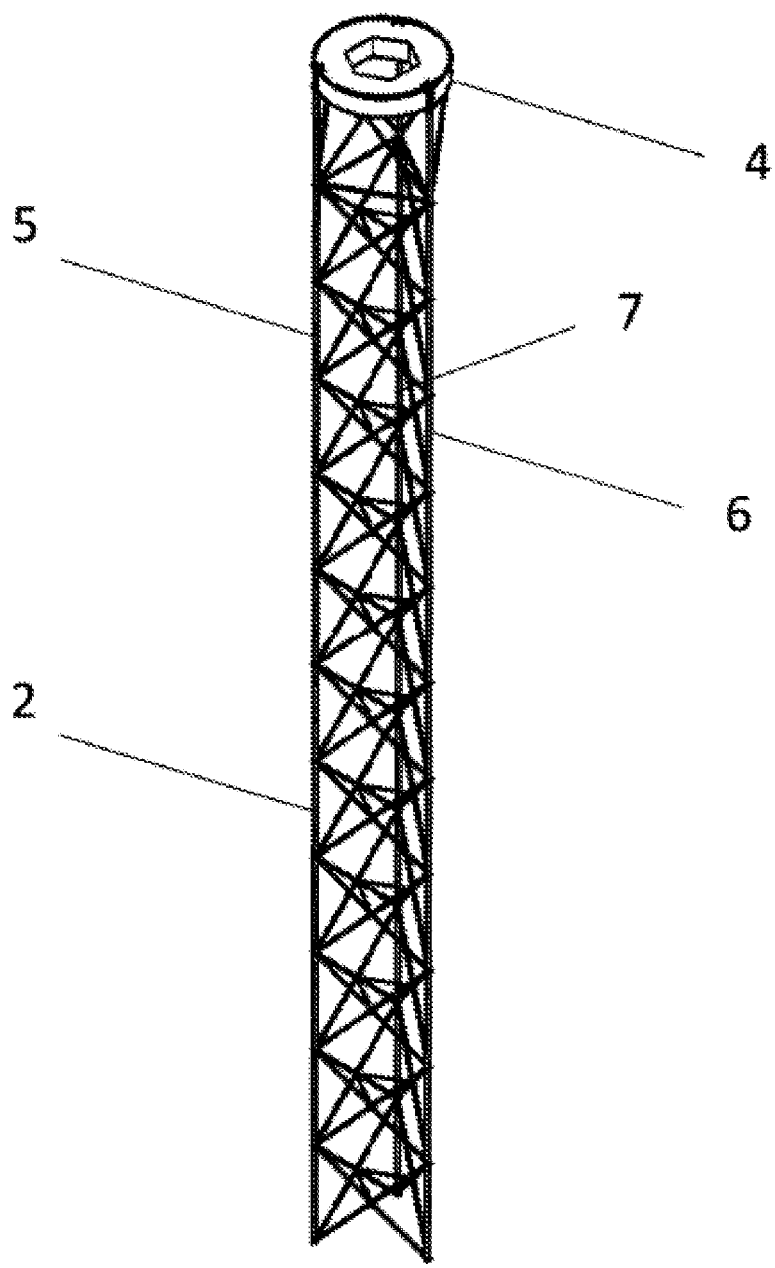
FIG. 2 is a perspective view of a tower and a transition piece.
Figure 3:
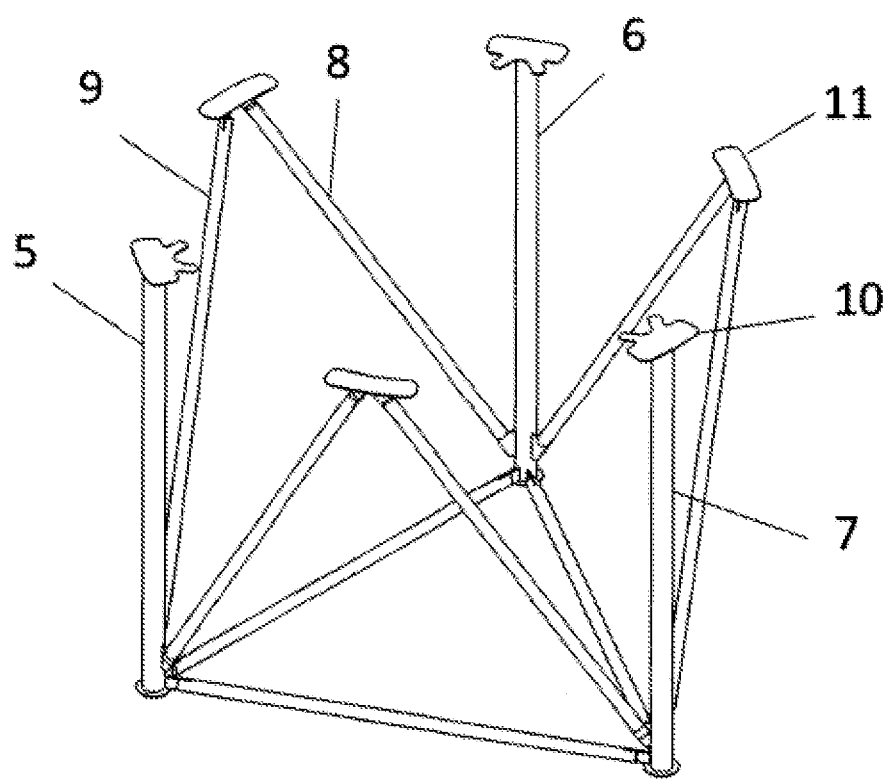
FIG. 3 is a detail of the upper part of the lattice tower having three legs with reinforcements.

FIG. 2 shows the tower 2 and connecting system 4. According to one embodiment the tower 2 is formed by a lattice having three legs 5, 6, 7 residing in the upper part. Between said legs reinforcement bracings 8, 9 are arranged, attached in pairs, as shown in FIG. 3. In the upper part of the legs 5, 6, 7 and in the upper part of the attachments of the reinforcement bracings 8, 9, there are connecting platens 10 and 11 preferably screwed thereto.

Figure 4:
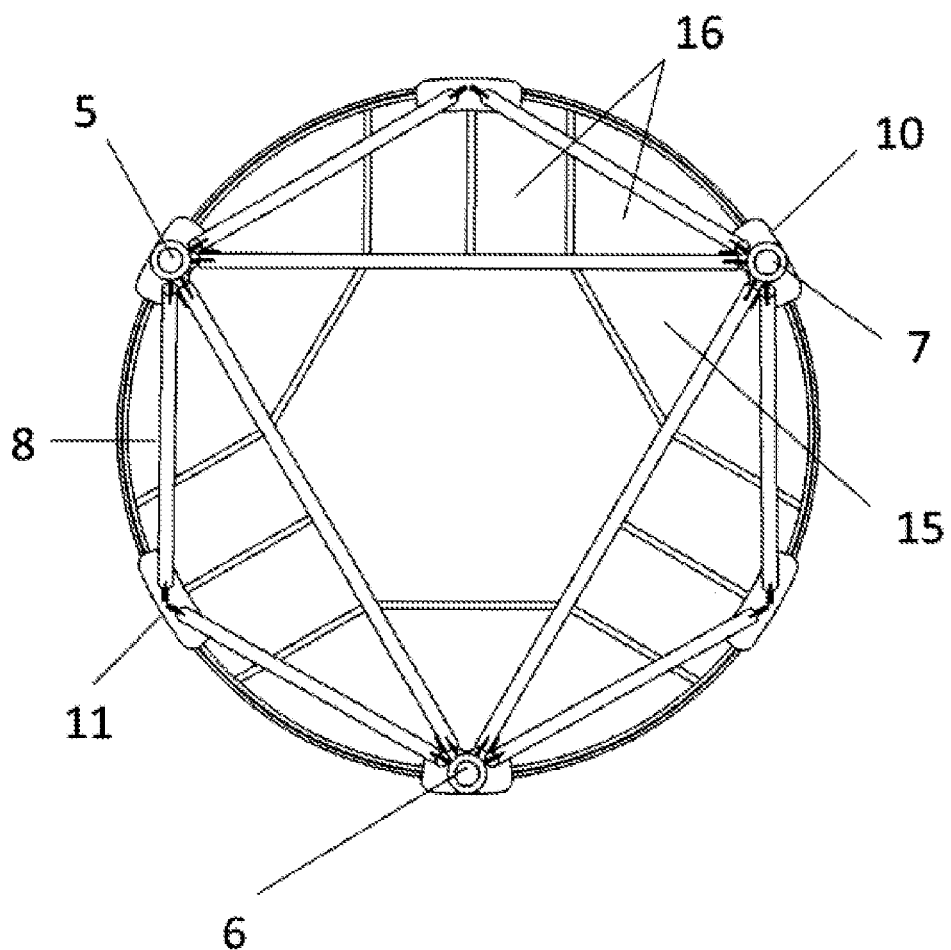
FIG. 4 shows a bottom plan view of the attachment of the lower transition piece to the lattice.

The platens have different shapes according to if they are arranged on the legs or on the bracings. The connection between the legs 5, 6, 7 of the tower 2 and the connecting piece 4 is carried out using the larger platens 10, since these pieces also have to overlap the ribs. The reinforcement bracings 8, 9 are attached to the connecting piece 4 by means of the smaller platens 11. Once the connecting piece 4 and the legs 5, 6, 7 are assembled, the resulting attachment is as depicted in FIG. 4. Said figure shows horizontal plates 16 corresponding to the lower face 15 of said connecting piece 4.

Figure 5:
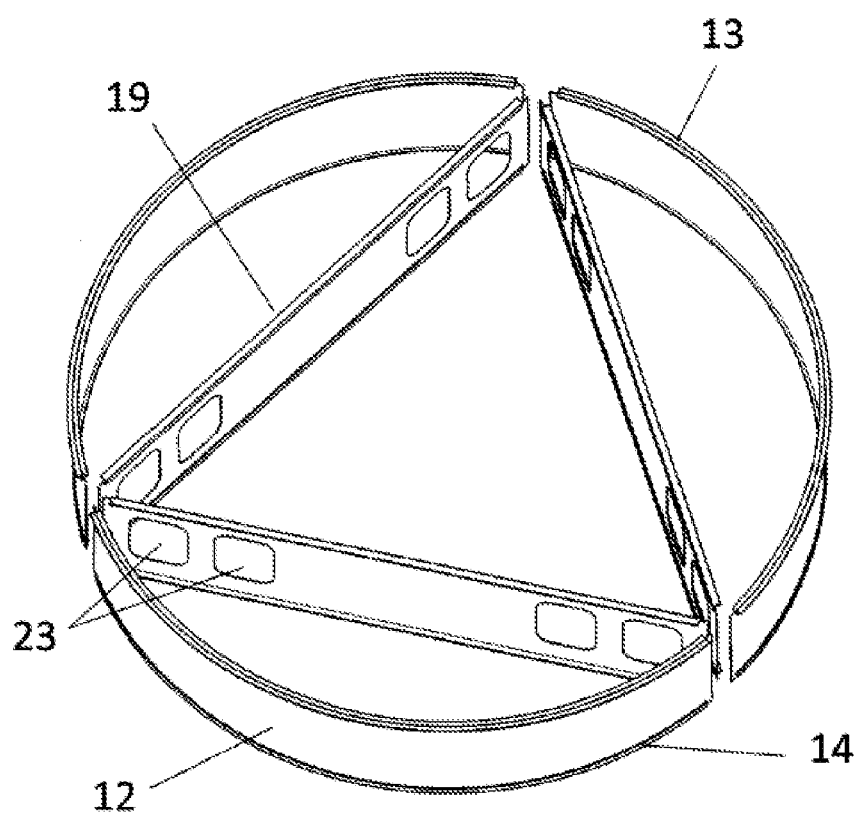
FIG. 5 depicts the different modules and the assembly of the transition piece.

FIG. 5 shows a fragmented depiction of the connecting piece 4. In the embodiment of FIG. 5 the connecting piece 4 comprises three semicircles and three central ribs 19. The central ribs 19 form an equilateral triangle inscribed in the annular connecting piece 4 and have relief windows 23 close to their ends.

Figure 6:
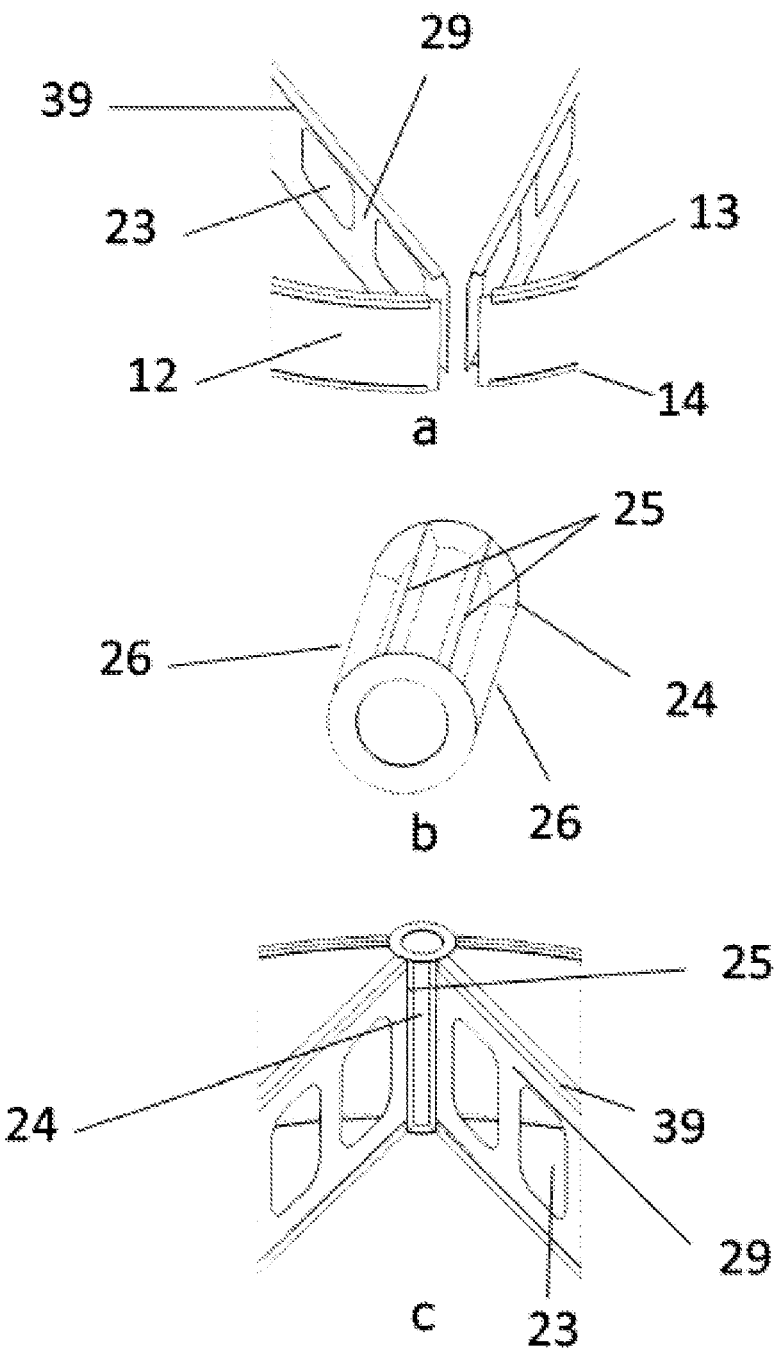
FIG. 6 shows different details of the assembly.

The constructive details of the assembly are achieved with a cylindrical attachment piece 24 with two inner walls 25 close to one another and two outer walls 26 spaced from one another by about 180°. In addition, the final ends of the central ribs 19 and the outer vertical plates 12 are supported between the upper ring 13 and the lower ring 14. These upper and lower rings are the elements that are primarily responsible for the flexural rigidity of the circular structure. The central ribs are formed by the webs 29 which is the structural part, and the flanges 39 which is the structural part perpendicular to the web, which is the element primarily responsible for the flexural rigidity of the structure. Once the cylindrical attachment piece 24 is arranged between all these elements, the inner walls 25 are fixed to the webs 29 of the central ribs 19 and the outer walls 26 are fixed to the vertical plates 12, as shown in FIG. 6 in details a, b and c. For the sake of simplicity, the screws or shear bolts that would attach all the overlapping platens (26 with 12 and 25 with 29) are not shown.

Figure 7:
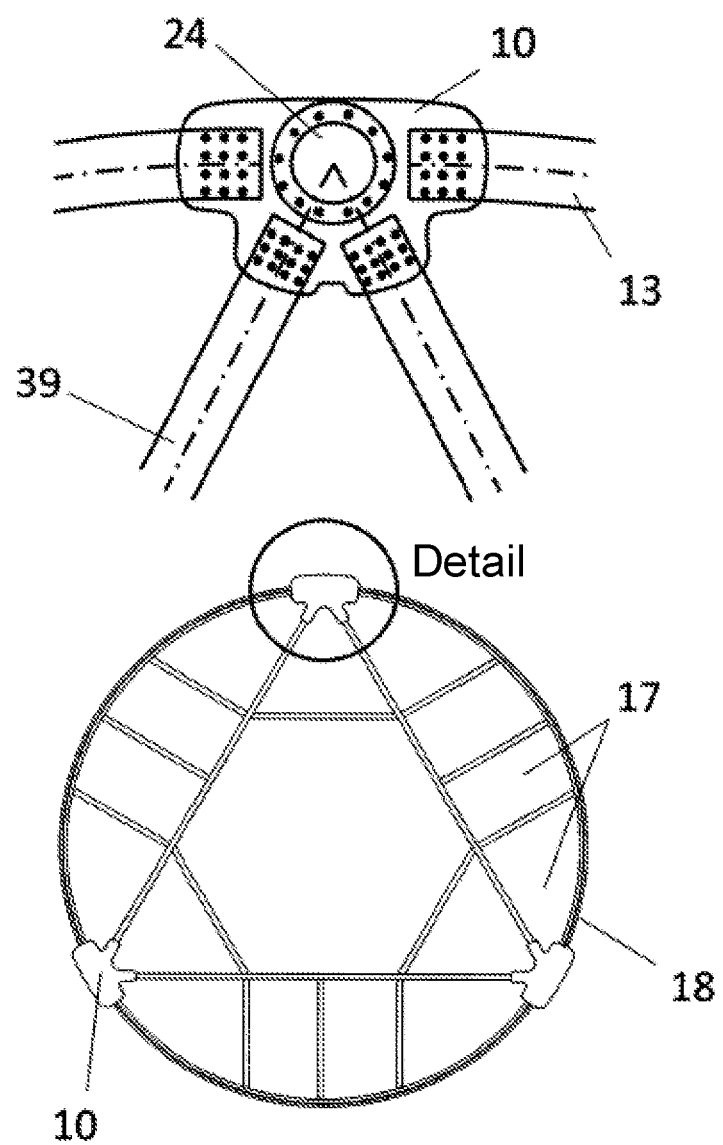
FIG. 7 is a plan view of the upper horizontal face of the transition piece and a detail of an assembly point of the modular connecting piece.

FIG. 7 shows the upper face 18 of the connecting piece 4 and the detail of how the platen 10 is preferably attached by screwing to the final ends of the central ribs 19, to the two ends corresponding to the upper ring 13 and to the upper circular part of the attachment piece 24.

Figure 8:
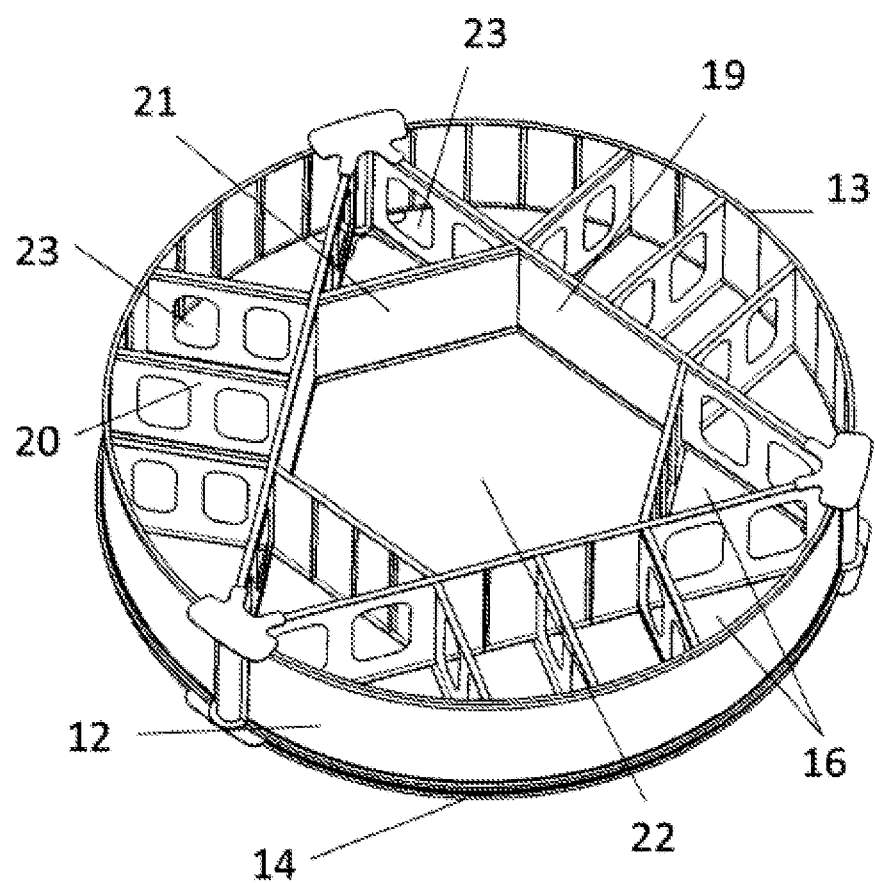
FIG. 8 is a perspective view of the inside of the transition piece.

FIG. 8 shows an internal configuration of the connecting piece 4. There is an upper ring 13 and a lower ring 14 between which a series of outer vertical plates 12, which are complemented with their corresponding horizontal plates 16, 17, are arranged. The lower horizontal plates 16 correspond to the lower face 15 and the upper horizontal plates 17 with the upper face 18. A series of central ribs 19 forming an equilateral triangle are arranged inside the connecting piece 4. Another series of transverse ribs 20 are attached between the central ribs 19 and the rings 13, 14 and have windows 23 like the central ribs 19 do. Other auxiliary ribs 21 are arranged between the central ribs 19 and form a hexagonal shape which will be clear, a large opening 22 in the center of the connecting piece 4 being created.

Figure 9:
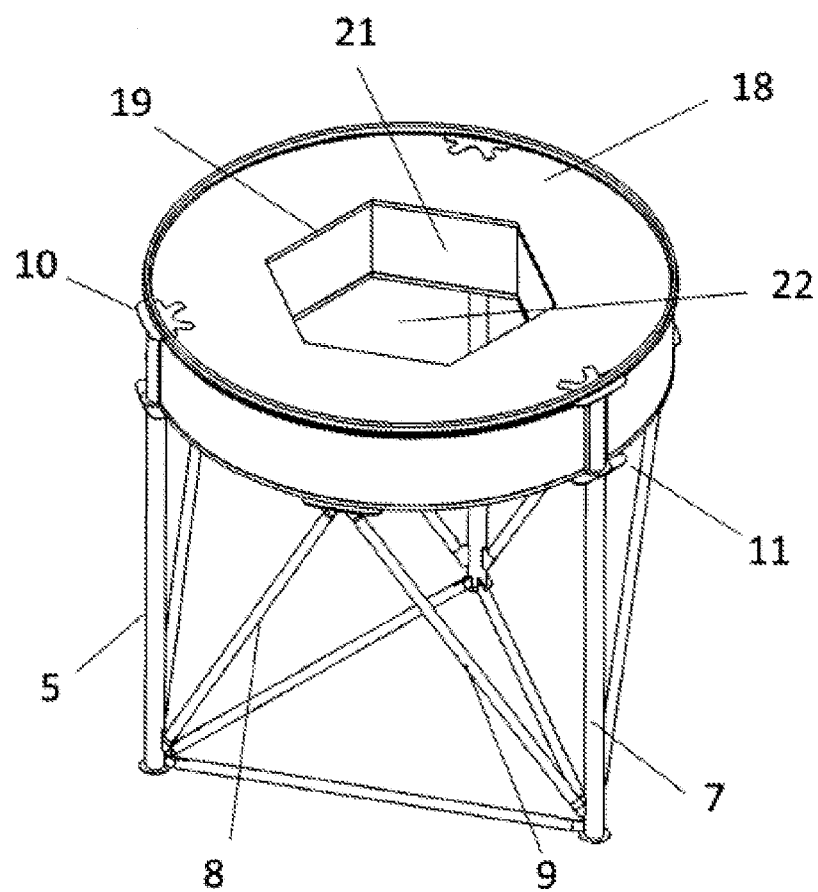
FIG. 9 shows an overview of the tower and transition piece assembly.

FIG. 9 shows the assembly once it has been assembled and mounted on the tower. The upper face 18 has a clear horizontal surface with a large central opening 22 that is very useful for subsequently mounting the drive train and the rest of the elements used for the generating electric power. According to one embodiment, the connecting piece 4 has a diameter of 15 meters and a height of 2 or 3 meters, and it internally houses different pieces of equipment required for energy conversion.

Figure 10:
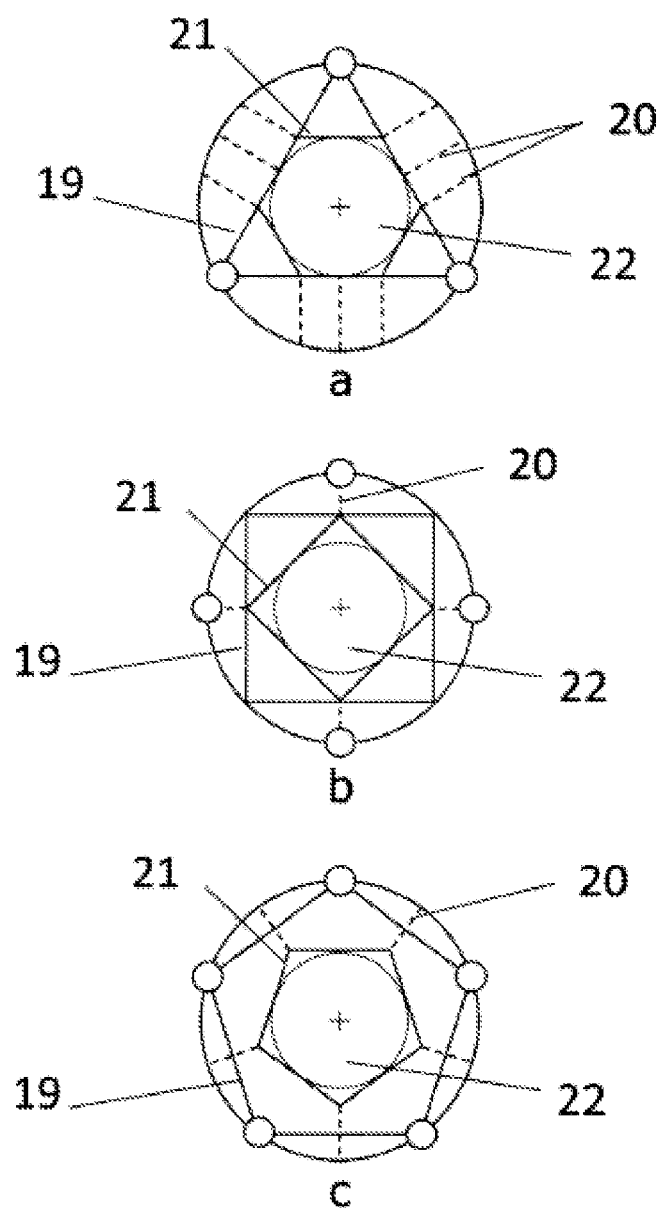
FIG. 10 depicts different solutions with different towers having three, four or five legs.

As shown in FIG. 10, there are different practical embodiments depending on whether the lattice tower supporting the connecting piece 4 has three legs (option a), four legs (option b) or five legs (option c). The configuration of the piece will only change the number and arrangement of the ribs. For all three cases, there will be central ribs 19 withstanding circular bending of the structure, transverse ribs 20 and auxiliary ribs 21 securing the assembly. The central ribs 19 will form polygons inscribed inside the connecting piece 4: a triangle, square, pentagon, etc., depending on the number of legs that are part of the lattice tower 2.

What is claimed is:

1. An apparatus for connecting a tower and a nacelle of a wind turbine, an upper part of the tower having a number of legs on which the apparatus is supported, the apparatus comprising:
   a number of central ribs, the number of central ribs being at least equal in number to the number of legs of the tower,
   a number of semi-circular sectors, the number of semi-circular sectors being at least equal in number to the number of central ribs, each semi-circular sector being coupled to at least two of the central ribs by an attachment piece,
   a central through opening,
   the semi-circular sectors together comprising:
      an upper ring,
      a lower ring,
      one or more vertical plates that are attached to and extend between the upper and lower rings,
      an upper face formed by a plurality of upper horizontal plates,
      a lower face formed by a plurality of lower horizontal plates.

2. The apparatus according to claim 1, wherein the number of legs is three legs, the number of central ribs is three central ribs and the number of semi-circular sectors is three semi-circular sectors.

3. The apparatus according to claim 1, further comprising transverse ribs that extend between the central ribs and the semi-circular sectors.

4. The apparatus according to claim 3, further comprising auxiliary ribs that extend between the central ribs.

5. The apparatus according to claim 3, wherein the transverse ribs comprise relief windows.

6. The apparatus according to claim 1, further comprising auxiliary ribs that extend between the central ribs.

7. The apparatus according to claim 6, wherein the auxiliary ribs define in part the central through opening.

8. The apparatus according to claim 1, wherein the central ribs comprise relief windows.

9. The apparatus according to claim 1, wherein the attachment piece has two inner walls and two outer walls, the central ribs include webs that are attached to the two inner walls and the vertical plates extending between the upper and lower rings being attached to the two outer walls.

10. The apparatus according to claim 9, wherein the attachment piece has a circular configuration with the two inner walls and two outer walls extending radially outward.

11. The apparatus according to claim 9, wherein the central ribs are secured to the attachment piece by a screw attachment.

12. The apparatus according to claim 9, wherein the semi-circular sectors are secured to the attachment piece by a screw attachment.

13. The apparatus according to claim 1, wherein the central ribs are arranged to form a triangle.

14. The apparatus according to claim 1, wherein the central ribs are arranged to form a polygon.

15. The apparatus according to claim 1, wherein reinforcement bracings are arranged between the legs of the tower in the upper part of the tower, the legs and reinforcement bracings including connecting flats, the connecting flats of the legs being larger than the connecting flats of the reinforcement members, the connecting flats of the legs being attached to a respective attachment piece, the connecting flats of the reinforcement members being attached to the lower ring of a respective semi-circular sector.

* * * * *